Figure 1:
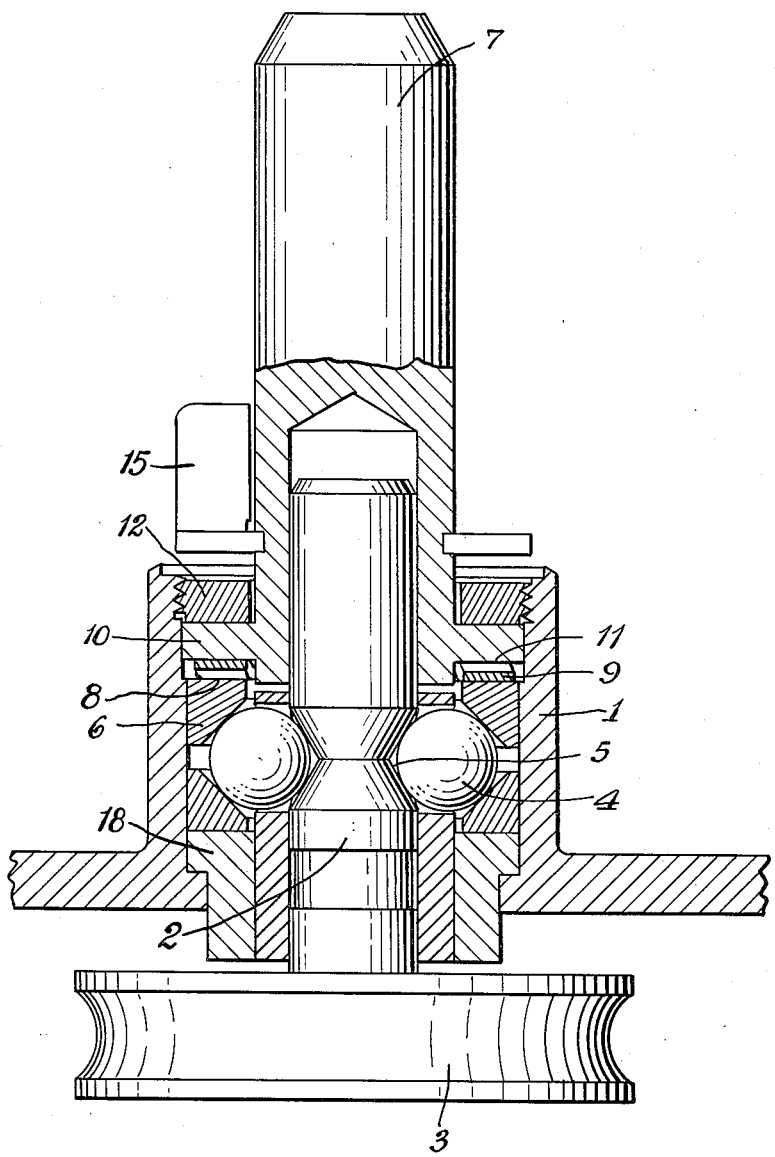

United States Patent Office 2,997,899
Patented Aug. 29, 1961

2,997,899
SPINDLE DRIVE FOR A MOTION PICTURE FILM TAKE-UP REEL
Heinz Thiele, Kiel-Wik, Germany, assignor to Zeiss Ikon Aktiengesellschaft, Stuttgart, Germany
Filed Mar. 21, 1960, Ser. No. 16,459
Claims priority, application Germany Mar. 21, 1959
3 Claims. (Cl. 74—798)

The present invention relates to a spindle drive for a motion picture film take-up reel.

This type of a spindle drive is usually mounted on a motion picture projector and is operated by the drive motor or a separate motor arranged in or on a motion picture projector.

The object of the present invention is to provide a particularly advantageous construction of such a spindle drive.

A further object of this invention is to provide a bearing for the spindle drive which is arranged on a wall of the projector and includes a planetary ball gearing between the drive shaft and the spindle on which the take-up reel is to be mounted, said gearing causing a speed reduction of the spindle.

Another object of the present invention is to provide an adjustable friction clutch in addition to said planetary ball gearing. This friction clutch employs, for instance, a wave-shaped spring ring arranged between one end face of the driven ring of the planetary ball gearing and one end face of a collar provided on the spindle, whereby the adjustment of this clutch is effected by a manually adjustable threaded ring which is in threaded engagement with the bearing wall and engages the opposite end face of the collar on the spindle.

The two figures of the drawing show each a different embodiment of the spindle drive of the invention.

In the drawing the numeral 1 indicates the spindle bearing in the side wall of a motion picture projector housing. A drive shaft 2 with a grooved pulley 3 thereon is connected over a belt drive with the main drive shaft of the motion picture projector. The rotation of the drive shaft 2 is transmitted to the balls 4 of a planetary ball gearing. The balls 4 of this gearing engage the walls of a double conical groove 5 provided in the drive shaft 2. The non-slidably mounted balls 4 transmit their rotary movement to a ring 6 which concentrically surrounds the shaft 2 and encloses all the balls. The outer ring 6 of the planetary ball gearing will, therefore, receive a rotary movement in opposite direction to the rotary movement of the drive shaft 2. Because of the different diameters of the drive shaft 2 and the outer ring 6, the ring 6 will have a smaller circumferential speed than the drive shaft. The planetary ball gearing provided in the spindle bearing 1 will, therefore, reduce the speed of the outer ring 6 below that of the drive shaft 2. A bushing 18 is secured in the spindle bearing 1, as shown.

The upper end face 8 of the outer ring 6 of the planetary ball gearing faces the reel spindle 7 and engages one side of a coupling element 9, which in this case has the form of a wave-shaped spring ring. The other side of said coupling element 9 engages the lower annular face 11 of a collar 10 provided on the spindle 7. An adjusting member 12 having the form of an exteriorly threaded ring, which engages an interior thread in the bearing 1, presses against the upper annular face of the collar 10 and urges the latter against said wave-shaped spring ring 9. Depending upon the pressure exerted upon said collar 10 of the spindle 7, and which pressure is adjustable by the ring 12, the collar 10 and therewith the spindle 7 will be rotated by said planetary ball gearing to a greater or lesser extent. The slippage of the take-up reel spindle 7 will thus be adjustable by an adjustment of the threaded ring 12 so that the speed of the spindle will adapt itself to the respective conditions, namely according to the weight and size of the spool of film on the take-up reel.

The inventive arrangement has the advantage that with the aid of a planetary ball gearing, which requires a minimum of space and is very simple in its construction, the relatively high speed of the drive shaft 2 can be reduced to a relatively low speed of the take-up spindle 7. The dimensions of the device can be made very small by the coaxial arrangement of the drive shaft, the planetary ball gearing, the adjustable friction coupling and the take-up spindle. All these parts are arranged in a common bearing firmly built into the housing of the device. The dimensions of the inventive arrangement can be made so small that it will be possible to apply this arrangement without difficulties also to attachable and pivotally mounted reel holders, respectively. The device is particularly applicable for portable and small film motion picture projectors, the dimensions of which must be very small in order to provide an easily portable projector.

Figure 2:
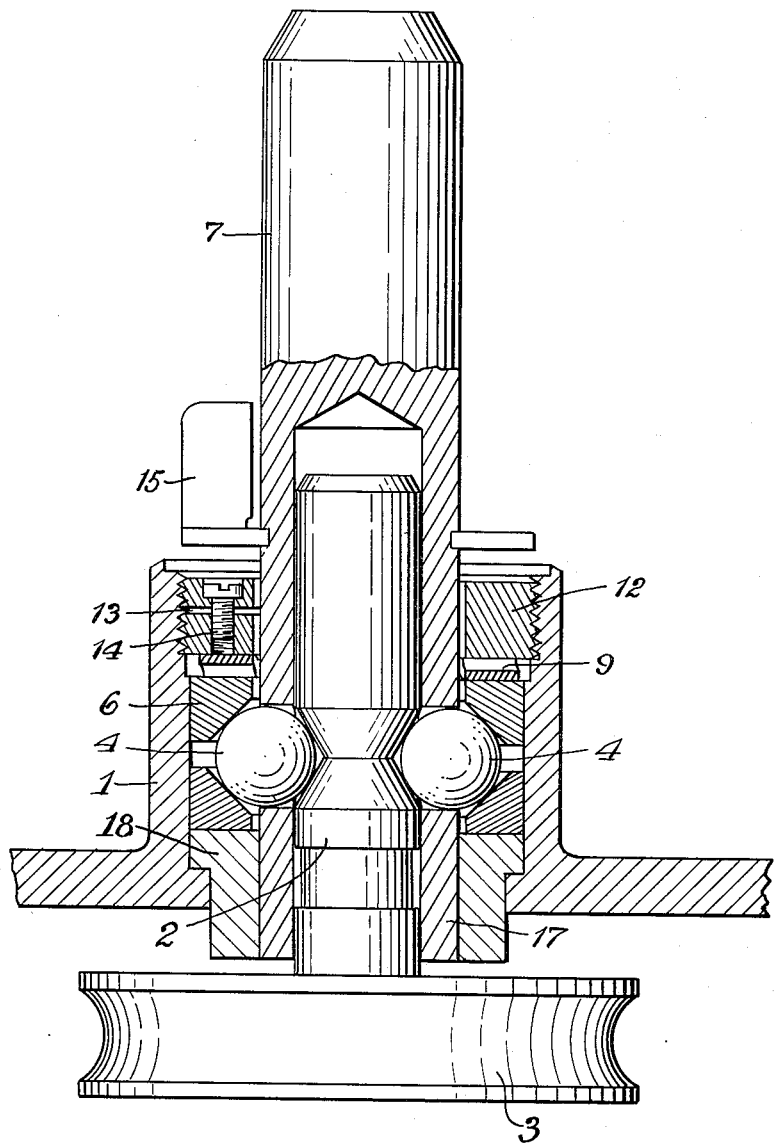

FIGURE 2 illustrates another embodiment of the invention in which the rotative movement of the drive shaft 2 is transmitted by the balls 4 of the planetary ball gearing directly to the driven spindle 7. The balls 4 are supported in a cage 17 formed by the tubular lower end of the spindle 7 and rotatably received in a bushing 18 secured in the spindle bearing 1. The upper outer ring 6 of the planetary ball gearing is non-rotatably mounted in the bearing 1. The ball cage 17 formed by the spindle 7 is rotated during the rotation of the shaft 2 on account of the rolling of the balls 4 along the inner face of the outer ring 6 in the same direction as the shaft 2. Therefore, the spindle 7 rotates in the same direction as the shaft but with a relatively lower speed as a result of the interposed planetary ball gearing. In this embodiment also the outer ring 6 is subjected to the action of a coupling element having the shape of a spring ring 9 which is urged with adjustable pressure by a threaded ring 12 against the upper end face of the ring 6. The ring 6 therefore is yieldably urged against the balls of the planetary ball gearing, so that even when the drive shaft 2 and the spindle 7 are subjected to non-uniform loads the balls 4 may slide on the engaging faces of the ring 6 and the shaft 2, respectively. The planetary ball gearing in this manner forms at the same time a slide coupling whose friction is adjustable by the manually adjustable threaded ring 12 acting upon the spring ring 9. For locking the ring 12 in position the same is provided with a horizontal slot 13 and a screw 14 which traverses the slot 13 permits a jamming of the thread of the ring 12 in the interior thread of the bearing 1, so that an accidental rotation of the ring 12 is prevented. The spindle 7 is provided with a key 15 for engagement in a suitable keyway in the film take-up reel (not shown).

What I claim is:

1. A device for driving the spindle for a motion picture film take-up reel, including a bearing on a wall of the projector housing, a drive shaft and a spindle rotatably supported in axial alignment in said bearing, a planetary ball gearing arranged in said bearing and between said drive shaft and spindle for driving said spindle with a reduced speed by said drive shaft, a manually adjustable friction clutch between said planetary ball gearing and said spindle, said friction clutch including a wave-shaped spring ring arranged between a driven ring of said planetary ball gearing and one end face of a collar on said spindle, and an axially adjustable ring in said bearing and engaging the other end face of said collar.

2. A device for driving the spindle for a motion picture film take-up reel, including a bearing on a wall of the projector housing, a drive shaft and a spindle rotatably supported in axial alignment in said bearing, a planetary ball gearing arranged in said bearing and between said drive shaft and spindle for driving said spindle with a reduced speed by said drive shaft, a manually adjustable friction clutch between said planetary ball gearing and said spindle, said friction clutch including a wave-shaped spring ring arranged between a driven ring of said planetary ball gearing and one end face of a collar on said spindle, and an axially adjustable ring in said bearing and engaging the other end face of said collar, said adjustable ring being in threaded engagement with the bore of said bearing and being accessible for manual adjustment from the outside of said bearing.

3. A device for driving the spindle for a motion picture film take-up reel, including a bearing on a wall of the projector housing, a drive shaft and a spindle rotatably supported in axial alignment in said bearing, and a planetary ball gearing arranged in said bearing and between said drive shaft and spindle for driving said spindle with a reduced speed by said drive shaft, said planetary gearing including a ball cage formed by a tubular portion of said spindle, which tubular portion is in telescopic engagement with said drive shaft and is rotatably supported in said bearing.

References Cited in the file of this patent

UNITED STATES PATENTS

| | | |
|---|---|---|
| 1,490,340 | Nielsen | Apr. 15, 1924 |
| 2,853,899 | Graham et al. | Sept. 30, 1958 |